United States Patent Office 2,761,876
Patented Sept. 4, 1956

2,761,876

HYDRAZINOSULFONYLPHENYLAMIDOPROPANEDIOLS AND PREPARATION

Walter A. Gregory, Wilmington, Del., assignor to E. I. du Pont de Nemours and Company, Wilmington, Del., a corporation of Delaware No Drawing. Application December 23, 1953, Serial No. 400,097

8 Claims. (Cl. 260—556)

This invention relates to hydrazinosulfonylphenylamidopropanediols and a method for preparing them.

This application is a continuation-in-part of my copending case Serial No. 384,794, filed October 7, 1953, now abandoned, which in turn is a continuation-in-part of my copending parent case, United States Patent No. 2,680,120.

The hydrazinosulfonylphenylamidopropanediols of my invention can be represented by the formula (1)
$$R_1-N(R_2)-N(R_3)-S(=O)_2-\text{C}_6\text{H}_4-\text{CH(OH)}-\text{CH(NH-Acyl)}-\text{CH}_2\text{OH}$$

where $R_1$ represents hydrogen, lower alkyl and phenyl; $R_2$ and $R_3$ can be the same or different and are members of a class consisting of hydrogen and lower alkyl. Acyl represents a carboxylic acid acyl radical, such as for instance, acetyl, chloroacetyl, bromoacetyl, dichloroacetyl and dibromoacetyl.

I regard the presence of the hydrazinosulfonyl group peculiarly significant and believe that this group lends to the phenylamidopropanediols their unusual and valuable properties.

The terms "lower alkyl" and "lower alkoxy" are used herein to include all alkyl and alkoxy radicals containing not more than 6 carbon atoms.

Illustrative of the sulfonylphenylamidopropanediols of my invention are:

1 - [p - (2 - methylhydrazinosulfonyl)phenyl] - 2 - (alpha,alpha-dichloroacetamido)-1,3-propanediol
1 - [p - (2 - ethylhydrazinosulfonyl)phenyl] - 2 - (alpha, alpha-dichloroacetamido)-1,3-propanediol
1 - (p - hydrazinosulfonylphenyl) - 2 - (alpha,alpha - dichloroacetamido)-1,3-propanediol
1 - (p-hydrazinosulfonylphenyl) - 2 - (alpha,alpha - dibromoacetamido)-1,3-propanediol
1 - [p - (1 - methylhydrazinosulfonyl)phenyl] - 2 - (alpha,alpha-dichloroacetamido)-1,3-propanediol
1 - (p - hydrazinosulfonylphenyl) - 2 - acetamido - 1,3 - propanediol
1 - [p - (2 - phenylhydrazinosulfonyl)phenyl] - 2 - alpha,alpha-dichloroacetamido)-1,3-propanediol
1 - [p - (1,2 - dimethylhydrazinosulfonyl)phenyl] - 2 - (alpha,alpha-dichloroacetamido)-1,3-propanediol
1 - [p - (2,2 - dimethylhydrazinosulfonyl)phenyl] - 2 - (alpha,alpha-dichloroacetamido)-1,3-propanediol
1 - [p - (1,2,2 - trimethylhydrazinosulfonyl)phenyl] - 2 - (alpha,alpha-dichloroacetamido)-1,3-propanediol
1 - [p - (1 - ethylhydrazinosulfonyl)phenyl] - 2 - (alpha, alpha-dichloroacetamido)-1,3-propanediol
1 - [p - (2,2 - diethylhydrazinosulfonyl)phenyl] - 2 - acetamido-1,3-propanediol
1 - [p - (1,2 - dibutylhydrazinosulfonyl)phenyl] - 2 - (alpha,alpha-dichloroacetamido)-1,3-propanediol The compounds of my invention can be prepared from previously known organic compounds by novel syntheses which I have discovered.

All of the compounds represented by Formula 1 may exist in the optical isomeric form. Stereoisomeric forms as used herein refer to the spatial arrangement of the polar groups on the two asymmetric carbon atoms with reference to erythrose and threose.

To differentiate between these two possible forms the diastereoisomeric pair related to erythrose in configuration will hereafter be designated as the erythro series and the diastereoisomeric pair related to threose as the threo series or form.

To further designate the threo form of the compounds of my invention I have designated as the threo form the product obtained from the reaction between the threo form of a fluorosulfonylphenylamido-1,3-propanediol having the formula (2)
$$F-S(=O)_2-\text{C}_6\text{H}_3(R)-\text{CH(OH)}-\text{CH(NH-Acyl)}-\text{CH}_2\text{OH}$$

where acyl has the same significance as in Formula 1 with an appropriate hydrazine.

Both the threo and erythro forms exist as racemates of optically active dextro ($d$) and levo ($l$) rotatory isomers as well as in the form of the individual or separated dextro ($d$) and levo ($l$) optical isomers.

In view of the difficulty of representing the various optical isomers with plane formulas, I have used the customary structural formulas and adapted the convention shown below in order to designate their optical configuration. An appropriate nomenclature is used under the formula, for example, ($l$)-threo form, ($d$)-threo form, ($dl$)-threo form, ($l$)-erythro form, ($d$)-erythro form and the like.

It will be understood that where no notation appears with a structural formula or with a chemical name the formula or name is to be interpreted in its generic sense; that is, as representing the ($d$)-threo, ($l$)-threo isomers or ($d$)-erythro, ($l$)-erythro isomers in separated form as well as the ($dl$)-threo or ($dl$)-erythro optical racemates or the mixture of all of the isomers and racemates. In other words, a formula or name represents not only the unresolved mixture of isomers but also the individual isomers and racemates.

The hydrazinosulfonylphenylamidopropanediols of the invention can be prepared by a process which comprises effecting reaction between a fluorosulfonylphenyl amidopropanediol of Formula 2 with a hydrazine of the formula (3)
$$R_1-N(R_2)-N(R_3)-H$$

where $R_1$, $R_2$ and $R_3$ have the same significance as in Formula 1.

The fluorosulfonylphenylamidopropanediols represented by Formula 2 and employed in the synthesis of the compounds of the present invention are fully described and claimed in United States Patent No. 2,680,134.

The fluorosulfonylphenylamido-1,3-propanediols can be prepared from a substituted benzenesulfonyl fluoride of the formula (4)
$$F-S(=O)_2-\text{C}_6\text{H}_3(R)-\text{CH}_2\text{CH}_3$$

where R has the same significance as in Formulas 1 and 2 in accordance with the process described and claimed in my aforementioned copending application. The process comprises, in brief, reacting a compound of Formula 4 with potassium permanganate in the presence of manganesium nitrate, followed by halogenation, addition of hexamethylenetetramine, treatment with sulfur dioxide and water, acidification, acylation, treatment with formaldehyde and a weak base, and finally a sodium borohydride reduction or a Meerwein-Ponndroff-Verley reduction.

Hydrazines of Formula 3 and acylated hydrazines of Formula 5, shown below, are known in the art. Illustrative of the hydrazines which I employ in the process of the invention there may be mentioned the following:

Hydrazine
Methylhydrazine
Ethylhydrazine
Phenylhydrazine
Unsym-dimethylhydrazine
Sym-dimethylhydrazine
1-methyl-2-phenylhydrazine
Trimethylhydrazine
Unsym-diethylhydrazine
Sym-dibutylhydrazine The reaction between a compound of Formula 2 and a hydrazine of Formula 3 is most conveniently carried out by bringing the reactants together in an aqueous medium. An aqueous medium is particularly preferred when the hydrazine employed is a water-soluble one. An excess of the hydrazine should be present to function as a base.

The reaction between the fluorosulfonyl derivative and a hydrazine can also be effected by using an equivalent quantity of hydrazine in the presence of any inorganic base such as for example, sodium hydroxide or calcium hydroxide, or in the presence of a tertiary organic base, for instance, pyridine or trimethylamine.

The reaction between a fluorosulfonylamidopropanediol and a hydrazine is exothermic. When phenylhydrazine is used the reaction is only slightly exothermic but when other hydrazines are employed, the reaction gives off substantial heat. Consequently, it is often preferred to employ external cooling to keep the temperature of the reaction mixture below 40° C. Temperatures in the range of from about −10° C. to about 70° C. are, however, operable.

In those cases where $R_1$ is alkyl, and $R_2$ and $R_3$ are hydrogen, in Formula 1, an alternative synthesis is preferred. This synthesis comprises bringing together, preferably in solution, a fluorosulfonyl-phenylamido-1,3-propanediol of Formula 2 and an acylated hydrazine of the formula (5) 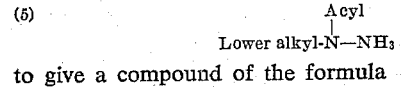

to give a compound of the formula (6) 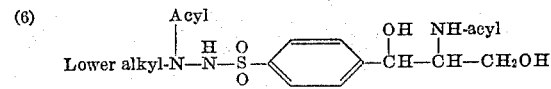

A compound of Formula 6 is then hydrolyzed with dilute aqueous acid, followed by treatment with a base or a suitable basic ion exchange resin, such as a strong-base type anion-exchanger containing quaternary ammonium groups, to give a compound having the formula (7) 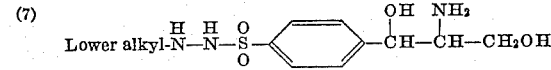

The above compound having Formula 7 is acylated with one molar equivalent of an acylating agent such as an acid anhydride, acid chloride, or ester, to give a compound of formula 1 where $R_1$ is lower alkyl, $R_2$ and $R_3$ are hydrogen, and acyl have the same significance as there stated.

The individual threo stereoisomeric form of the hydrazinosulfonylphenylamidopropanediols can be resolved into their optical isomers.

Hydrolysis of the hydrazino compounds to the amine salt can be readily effected with a hydrohalide acid. Resolution is then effected by forming an acid salt of the racemic amine of threo form with an optically active acid such as, for instance, (d)-camphor sulfonic acid, (l)-camphor sulfonic acid, (d)-tartaric acid, (l)-tartaric acid, (d)-mandelic acid and (l)-mandelic acid; by treating the hydrohalide salt with one of the above-named acids in the presence of an equivalent quantity of silver oxide or silver carbonate; separating the two diastereoisomeric products by recrystallization from a solvent such as, for instance, a lower aliphatic alcohol or mixture of the same with water or other organic solvents; and then regenerating the individually optically active isomers from the separated diastereoisomeric addition salts by treating each one separately with caustic or with a basic ion exchange resin. The hydrazinosulfonylphenylamidopropanediols are then prepared from these amines by acylation using an acid anhydride, acid chloride, or an ester.

When carrying out the resolution, as set forth above, it is preferred but not essential to choose the form of the optically active acid so that the diastereoisomer of which the desired optical isomer is a part will separate from the crystallization solution first.

The hydrazinosulfonylphenylamidopropanediols of my invention have a variety of uses. They can be used as corrosion inhibitors for acid solutions on metal; as blowing agents for polymeric materials, such as rubber and styrene; as anti-oxidants; and as anti-halation agent in photography. They may also be employed in electroplating, for instance, they may be added to cyanide-cadmium baths to produce a desirable deposit.

The compounds of the present invention have further utility in that they can be employed as disinfectants for the treatment of biological laboratory waste. The compounds find still further use as drugs in the control of bacterial and rickettsial infections.

In order to more fully understand the invention, reference should be had to the following illustrative examples:

EXAMPLE 1

*Preparation of (dl)-threo-1-(p-hydrazinosulfonylphenyl)-2-(alpha,alpha-dichloroacetamido)-1,3-propanediol*

A suspension of 1.00 g. of (dl)-threo-1-(p-fluorosulfonylphenyl) - 2 - (alpha,alpha-dichloroacetamido)-1,3-propanediol prepared as described in my copending application Serial No. 296,960, filed July 2, 1952, in 2 cc. of 64% aqueous hydrazine hydrate is stirred. The suspension is externally cooled to keep the temperature of the reaction mixture below 40° C. The solid reactant dissolves in a period of about 10 minutes. At the end of 15 minutes, the solution is brought to about pH 8 by adding concentrated hydrochloric acid. The solution is kept cold during the addition of acid.

The product, which separates from the solution as white crystals, consists essentially of (dl)-threo-1-(p-hydrazinosulfonylphenyl) - 2 - (alpha,alpha - dichloracetamido)-1,3-propanediol. The crystalline product is collected and found to have M. P. 162–165°. Its formula is as follows:

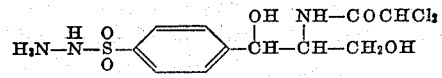

*Analysis.*—Calculated for $C_{11}H_{15}Cl_2N_3O_5S$: C, 35.51; H, 4.06; N, 11.29. Found: C, 35.54; H, 4.16; N, 11–55.

EXAMPLE 2

*Preparation of (dl)-threo-1-(p-hyrazinosulfonylphenyl)-2-acetamido-1,3-propanediol*

A 5 cc. portion of 64% aqueous hydrazine is stirred during the addition of 3 g. of (dl)-threo-1-(p-fluorosulfonylphenyl)-2-acetamido-1,3-propanediol. The reaction is exothermic and the temperature of the reaction mixture is allowed to rise to about 35° C.

The mixture is stirred for a period of 20 minutes after the addition is complete.

The desired product is isolated by removing the excess hydrazine from the reaction system by distillation at reduced pressure, adding water and adjusting the pH of the aqueous system to about 7.5. The (dl)-threo-1-(p-hydrazinosulfonylphenyl)-2-(acetamido)-1,3-propanediol separates as white crystals. They are collected. The crystalline product has the following structural formula:

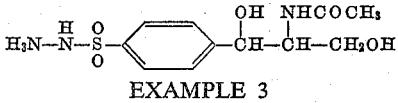

EXAMPLE 3

*Preparation of (dl) - threo-1-[p-(1-methylhydrazinosulfonyl)phenyl] - 2 - adpha,alpha - dichloroacetamido)-1,3-propanediol*

An aqueous solution of methylhydrazine is prepared by adding 29 g. of methylhydrazine sulfate to a solution of 20 g. of sodium hydroxide in 30 cc. of water. The solution is distilled at reduced pressure until the distillate is no longer basic.

The aqueous distillate (about 20 cc.) is stirred as 10 g. of (dl)-threo-1-(p-fluorosulfonylphenyl) - 2 - (alpha, alpha-dichloroacetamido)-1,3-propanediol is added. The temperature of the reaction mixture is maintained below 40° C. The mixture is stirred for a period of 15 minutes after solution is complete.

The excess methylhydrazine is removed from the reaction system by distillation under reduced pressure. The residue is triturated with water, and the pH is adjusted to 7. The product separates as white crystal and is collected. It can be represented by the structural formula

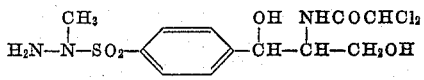

EXAMPLE 4

*Preparation of (dl)-threo-1-[p-(1,2-dimethylhydrazinosulfonyl)phenyl]-2-(alpha,alpha - dichloroacetamido)-1,3-propanediol*

A solution of 5 g. of symmetrical dimethylhydrazine in 5 cc. of water is stirred at room temperature as 2 g. of (dl)-threo-1-(p-fluorosulfonylphenyl) - 2 - alpha,alpha-dichloroacetamido)-1,3-propanediol is added. The reaction is exothermic. The temperature of the reaction mixture is kept below 35° C.

After the solid has dissolved, (the product may separate as it is formed) the solution is allowed to stand for a period of about 30 minutes. The excess symmetrical dimethylhydrazine is then removed from the reaction system by distillation under reduced pressure. The residue is triturated with water and the desired hydrazino derivative separates as white crystals. It is collected. Its formula is shown below:

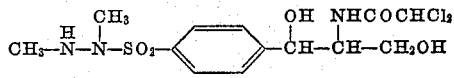

EXAMPLE 5

*Preparation of (dl)-threo-1-[p-(2-phenylhydrazinosulfonyl)phenyl] - 2 - (alpha,alpha - dichloroacetamido)-1,3-propanediol*

A mixture consisting essentially of 10 g. of phenylhydrazine and 2 g. (dl)-threo-1-(p-fluorosulfonylphenyl)-2 - (alpha,alpha - dichloroacetamido) - 1,3 - propanediol is stirred for a period of three days. The resulting mixture is added to 50 cc. of water.

The resulting solution is made acid with dilute hydrochloric acid. During acidification the temperature of the solution is kept below 20° C. The desired product, (dl)-threo - 1 - [p - (2 - phenylhydrazinosulfonyl)phenyl] - 2-(alpha,alpha - dichloroacetamido) - 1,3 - propanediol, separates as white crystals and may be purified by crystallizing from ethyl acetate. The product can be represented by the structure.

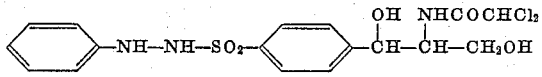

I claim:
1. (dl)-Threo-1-(p-hydrazinosulfonylphenyl)-2-(alpha,alpha-dichloroacetamido)-1,3-propanediol.
2. (dl) - Threo - 1 - (p - hydrazinosulfonylphenyl) - 2-acetamido-1,3-propanediol.
3. (d)-Threo-1-(p-hydrazinosulfonylphenyl)-2-(alpha,alpha-dichloroacetamido)-1,3-propanediol.
4. (l) - Threo - 1 - (p - hydrazinosulfonylphenyl) - 2-(alpha,alpha-dichloroacetamido)-1,3-propanediol.
5. In a process for preparing (dl)-threo-1-(p-hydrazinosulfonylphenyl) - 2 - (alpha,alpha - dichloroacetamido)-1,3-propanediol, the step of mixing (dl)-threo-1-(p - fluorosulfonylphenyl) - 2 - (alpha,alpha - dichloroacetamido)-1,3-propanediol with at least an equivalent quantity of hydrazine under basic conditions in the presence of water and at a temperature of from about —10° C. to about 70° C.
6. (dl) - Threo - 1 - [p - (1 - methylhydrazinosulfonyl)phenyl] - 2 - (alpha,alpha-dichloroacetamido) - 1,3 - propanediol.
7. A compound of the formula

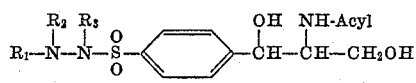

where $R_1$ is a member of the class consisting of hydrogen, lower alkyl and phenyl; $R_2$ and $R_3$ are members of the class consisting of hydrogen and lower alkyl; and acyl is a carboxylic acid acyl radical selected from the group consisting of acetyl, chloroacetyl, bromoacetyl, dichloroacetyl and dibromoacetyl.

8. A process comprising mixing under basic conditions a fluorosulfonylamido-1,3-propanediol of the formula,

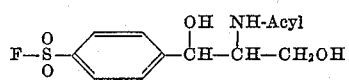

where acyl represents a carboxylic acyl radical selected from the group consisting of acetyl, chloroacetyl, bromoacetyl, dichloroacetyl and dibromoacetyl, with at least an equivalent quantity of a hydrazine of the formula

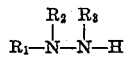

where $R_1$ is a member of the class consisting of hydrogen, lower alkyl and phenyl, and $R_2$ and $R_3$ are members of the class consisting of hydrogen and lower alkyl, to produce a hydrazinosulfonylphenylamido-1,3-propanediol of the formula,

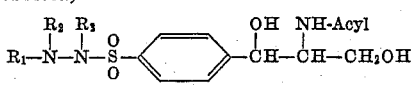

where $R_1$, $R_2$, and $R_3$ and acyl have the same significance as above.

References Cited in the file of this patent

UNITED STATES PATENTS

| | | |
|---|---|---|
| 2,680,120 | Gregory | June 1, 1954 |
| 2,680,135 | Gregory | June 1, 1954 |